United States Patent [19]

Kanno et al.

[11] Patent Number: 5,225,154
[45] Date of Patent: Jul. 6, 1993

[54] FUEL ASSEMBLY FOR NUCLEAR REACTOR, METHOD FOR PRODUCING THE SAME AND STRUCTURAL MEMBERS FOR THE SAME

[75] Inventors: Masayoshi Kanno, Kitaibaraki; Masahisa Inagaki, Hitachi; Iwao Takase, Ibaraki; Jiro Kuniya, Hitachi; Akira Maru, Ibaraki; Tetsuro Yasuda, Hitachi; Hideo Maki, Katsuta, all of Japan

[73] Assignee: Hitachi, Ltd., Tokyo, Japan

[21] Appl. No.: 391,316

[22] Filed: Aug. 2, 1989

[30] Foreign Application Priority Data

Aug. 2, 1988 [JP] Japan .................. 63-192982

[51] Int. Cl.⁵ .............................. G21C 3/00
[52] U.S. Cl. .................. 376/416; 376/414; 376/417
[58] Field of Search ............... 376/416, 414, 417; 148/11.5 F, 421; 427/239; 420/422, 423

[56] References Cited

U.S. PATENT DOCUMENTS

| | | | |
|---|---|---|---|
| 3,121,034 | 2/1964 | Anderko | 148/11.5 |
| 3,620,691 | 11/1971 | Rubel | 29/191 |
| 4,045,288 | 8/1977 | Armijo | 376/417 |
| 4,065,328 | 12/1977 | Cheadle | 148/12.7 |
| 4,238,251 | 12/1980 | Williams et al. | 148/133 |
| 4,390,497 | 6/1983 | Rosenbaum et al. | 376/414 |
| 4,452,648 | 6/1984 | Cheadle et al. | 148/11.5 F |
| 4,613,479 | 9/1986 | Foster | 376/416 |
| 4,649,023 | 3/1987 | Sabol et al. | 420/422 |
| 4,664,881 | 5/1987 | Ferrari et al. | 376/410 |
| 4,671,826 | 6/1987 | Prizzi | 148/11.5 F |
| 4,717,428 | 1/1988 | Comstock et al. | 148/11.5 |
| 4,810,461 | 3/1989 | Inagaki et al. | 376/457 |
| 4,842,814 | 6/1989 | Takase et al. | 376/438 |
| 4,981,527 | 1/1991 | Charquet | 148/11.5 F |
| 5,076,488 | 12/1991 | Graham | 228/131 |

Primary Examiner—Donald P. Walsh
Assistant Examiner—Meena Chelliah
Attorney, Agent, or Firm—Antonelli, Terry, Stout & Kraus

[57] ABSTRACT

A fuel assembly for a nuclear reactor comprising a fuel cladding tube of three-layer structure having an outer surface in contact with reactor water of the nuclear reactor, an inner surface layer in contact with the nuclear fuel, and an intermediate layer interposed between the outer surface layer and the inner surface layer. the outer surface layer is made of a Zr-based alloy containing Nb, Sn and Mo. The inner surface layer is made of pure zirconium. The intermediate layer is made of a high ductility alloy which is higher in ductility than the outer surface layer and is higher in strength than the inner surface layer.

66 Claims, 6 Drawing Sheets

FUEL ASSEMBLY FOR NUCLEAR REACTOR, METHOD FOR PRODUCING THE SAME AND STRUCTURAL MEMBERS FOR THE SAME

BACKGROUND OF THE INVENTION

The present invention relates to a fuel assembly for a nuclear reactor, and more particularly to a fuel assembly structural member, made of zirconium (Zr) alloys, such as a fuel cladding tube, a spacer, a channel box or the like.

Figure 2:
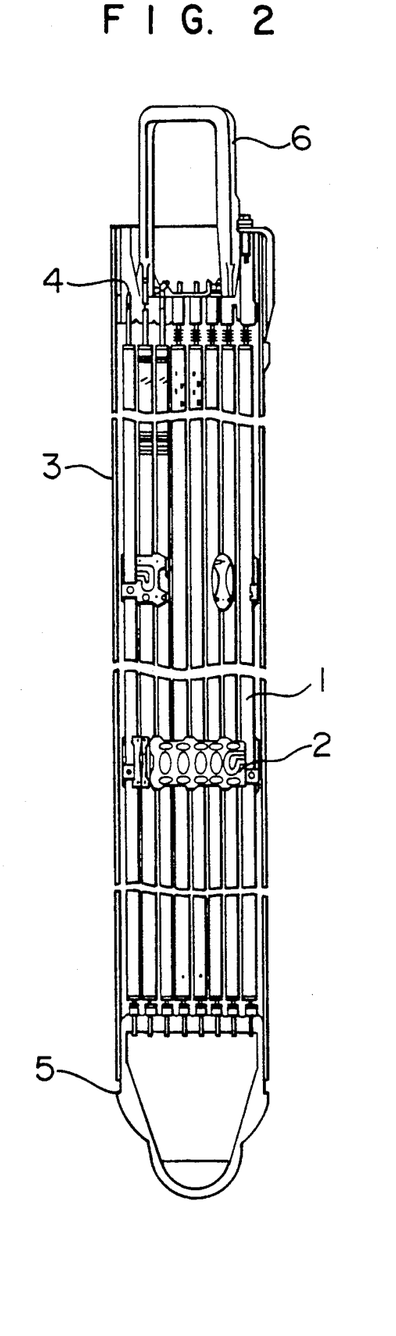
FIG. 2 is a schematic cross-sectional view showing a BWR fuel assembly.

Structural members of a fuel assembly for a nuclear reactor are generally made of zirconium alloy. FIG. 2 is a schematic cross-sectional view showing a fuel assembly for a BWR (boiling water reactor). The fuel assembly is composed of a number of fuel rods 1 each having fuel pellets in a cladding tube, a spacer 2 for retaining the fuel rods at a predetermined interval, a channel box 3 for encasing the fuel rods and the spacer, an upper tie plate 4 and a lower tie plate 5 for holding upper and lower ends of the fuel rods 1, and a handle 6 for transportation of the assembly as a whole. The fuel cladding tubes 11, the spacer 2 and the channel box 3 of these structural members are made of zirconium alloy and are assembled by welding.

Figure 3:
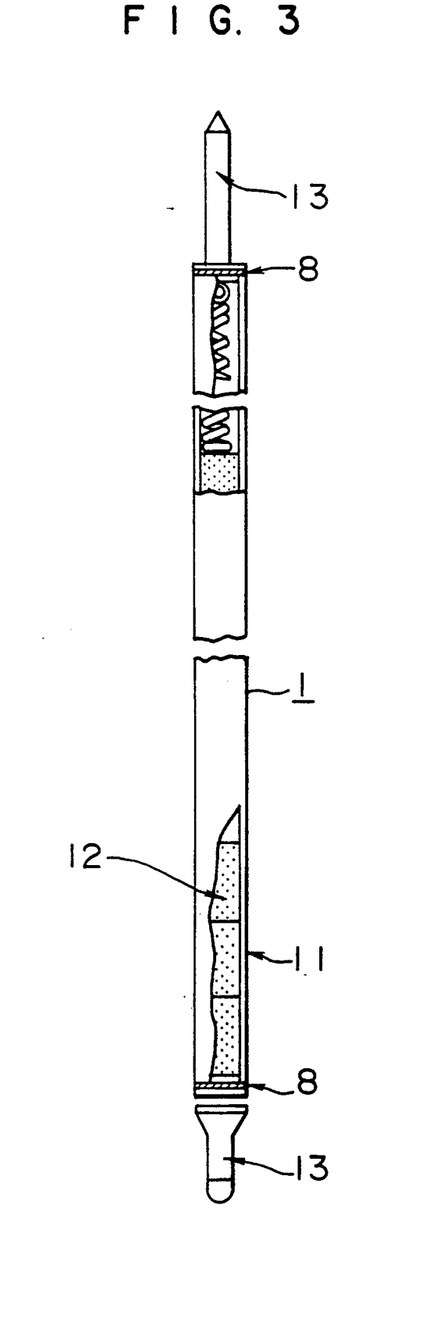
FIG. 3 is a view showing welded portions of a fuel rod.
Figure 4A:
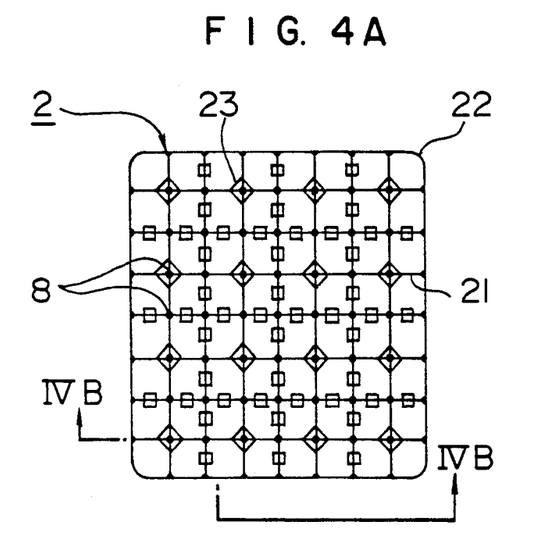
FIGS. 4a to 4d are views showing welded portions of a spacer.
Figure 4B:
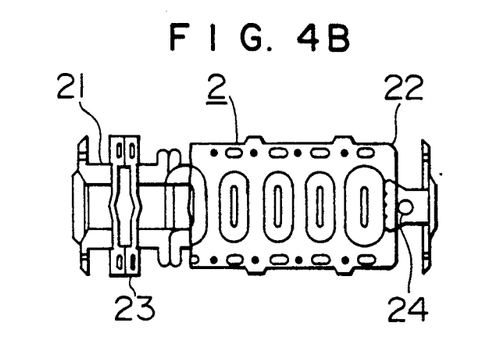
Figures 4C, 4D:
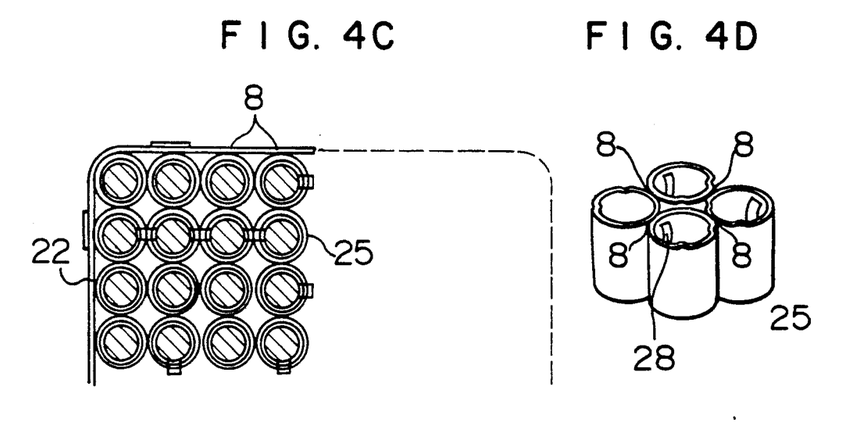
Figure 5:
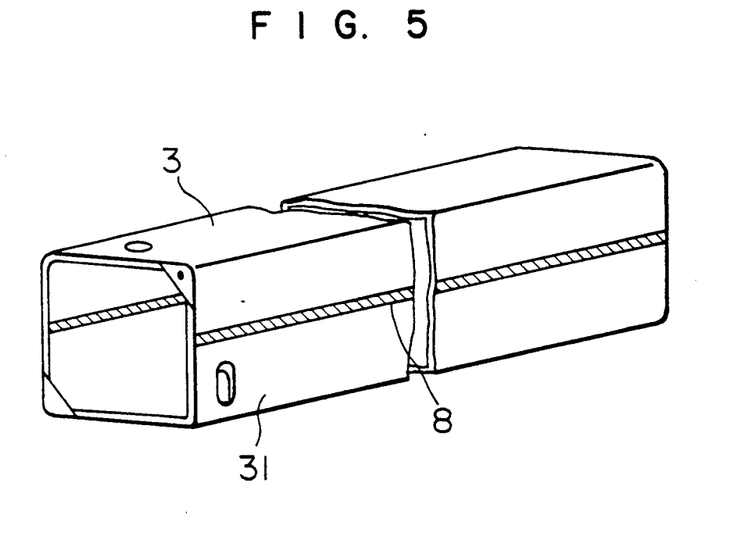
FIG. 5 is a view showing welded portions of a channel box.

FIGS. 3 to 5 show welded portions of the fuel rods 1, the spacer 2 and the channel box 3.

As shown in FIG. 3, end plugs 13 are mounted at welded portions 8 on both ends of each fuel cladding to be 11.

As shown in FIGS. 4A to 4D, spacers 2 are classified into two types, i.e., a lattice type and a circular type. The welded portions 8 of the lattice type spacer 2 are joint portions between spacer bars 21 and a spacer band 22, lattice points 23 at each of which the spacer bars 21 intersect with each other, and an overlapped portion of the spacer band 22, as shown in FIGS. 4a and 4B. On the other hand, the welded portions 8 of the circular spacer are contact points of spacer rings 25, contact portions between the spacer rings 25 and a spacer band 22, and an overlapped portion of the spacer band 22, as shown in FIGS. 4C and 4D.

FIG. 5 shows a shape and welded portions 8 of the channel box 3. The channel box 3 is manufactured by coupling and welding two U-shaped, bent members 31 together, so that two weld lines 8 extends longitudinally.

As described above, any one of the structural members has the welded portions.

The zirconium alloy members are used in the reactor water that is held at a high temperature and a high pressure. In general, the zirconium alloy has a high anti-corrosion and a small neutron absorption cross section. These properties of the zirconium alloy are suitable fuel assembly structural members for a nuclear reactor. The well known alloy are as follows: zircaloy-2 (Sn: 1.2 to 1.7%, Fe: 0.7 to 0.2%, Cr: 0.05 to 0.15%, Ni: 0.03 to 0.08, Zr: remainder); zircaloy-4 (Sn: 1.2 to 1.7%, Fe: 0.18 to 0.24%, Cr: 0.05 to 0.15%, Zr: remainder); Zr-1.0% Nb alloy; Zr-2.5% Nb alloy; Zr-3.5% Sn-0.8% Nb-0.8% Mo alloy (Excel alloy); Zr-1.0% Sn-1.0% Nb-0.2 to 0.5% Fe alloy; Zr-Nb (0.5 to 5%) Sn-(0 to 3.0%)-any one (up to 2.0%) of Fe, Ni, Cr, Ta, Pd, Mo and W; and the like.

It should be noted that, in the description, by weight is represented simply by % except for the case where it is necessary to distinguish these expressions.

When the so-called zircaloy, i.e., Zr-Sn-Fe-Cr-(Ni) alloy is used in a boiling water nuclear reactor, there occurs a local oxidation (hereinafter referred to as nodular corrosion). The generation of the nodular corrosion causes a thickness of normal portions of the structural member to be decreased, and at the same time, causes hydrogen generated in accordance with the corrosion reaction to be absorbed into the members, resulting in embrittlement of the members. Since the corrosion phenomenon is developed in accordance with a lapse of time, it is considered that the corrosion of the members is a factor for determining a service life of the fuel assembly under the operational condition of high degree of burn-up in which these members are used for a long period of time. Also, the hydrogen absorption of this alloy is higher than that of Zr-2.5% Nb alloy. Japanese Patent Unexamined Publication No. 58-22364 shows a heat treatment for quenching members from a temperature of $\alpha+\beta$ phase or $\beta$ phase in order to prevent the nodular corrosion. However, even with this method, it is impossible to prevent the nodular corrosion.

In a Zr-Nb alloy containing Nb, if the amount of Nb is increased, the mechanical strength is increased so that the hydrogen absorptivity is lower than that of the zircaloy. In addition, the local corrosion called "nodular corrosion" does not occur. However, as shown in "proceedings of the International Symposium on Environmental Degradation of Materials in Nuclear Power Systems Water Reactors", Myrtle Beach, S.C., August 22–25, pp. 274–294, since the corrosion property in the weld zone and heat-affected zone thereof is low, there is a problem in using the alloy for the welding structural members. Also, a ductility of the alloy is low so that the alloy is inferior in deformability against impact loads and the like.

Japanese Patent Unexamined Publication No. 61-170552 shows a method for producing a plate member and a tubular member made of high corrosion resistance Zr alloy containing Nb of 0.5 to 2.0%, Sn of 1.5% or less and Fe of 0.25% or less. In order to assemble this alloy as a fuel structural member, it is necessary to weld the high corrosion resistance plate and tubular members, so that the anti-corrosion property of the weld zone will be again degraded.

U.S. Pat. No. 3,121,034 shows a method for improving the weldability under the condition that a cold rolling reduction is 50 to 60% and the final heat treatment is performed at a temperature of 550° to 600° C. for 1 to 240 hours, by using Zr-0.5 to 5% Nb alloy, Zr-0.5 to 5% Nb-0 to 3% Sn alloy or quarternary alloy of Zr-0.5 to 5% Nb-0 to 3 Sn-0 to 2% any one of Fe, Ni, Cr, Ta, Pd, Mo and W. However, it would be difficult to perform an intensive working of several tens of percents for the weld structural member.

Japanese Patent Unexamined Publication 47-28594 shows a method for improving an anti-corrosion property by annealing a Zr-Nb alloy member after welding. However, according to the disclosure of the foregoing literature, even if such a heat treatment is performed, the property of the welded portions is not improved.

On the other hand, with respect to the fuel structural member of multi-layers, Japanese Patent Unexamined Publication Nos. 54-45495, 54-59660, 55-164396, 56-76088, 58-195485, 58-199836 and 58-216988 show a method in which a Zr liner layer is provided on an inner surface of a tube to thereby prevent a stress corrosion cracking due to a mutual effect between uranium dioxide and plutonium oxide pallets and the inner surface of the tube. However, this method has no effect for improving the corrosion resistance property of the outer surface of the tube.

In the foregoing prior art techniques, there is no total consideration for properties needed in the structural members for fuel of high degree of burn-up, such as an corrosion resistance property of weld zone, an corrosion resistance property of non-welded portions, a tensile property, and resistivity against hydrogen embrittlement. These properties have been incompatible with each other.

SUMMARY OF THE INVENTION

Accordingly, an object of the invention is to provide a fuel assembly for a nuclear reactor, having structural members that are provided with sufficient properties needed in structural members for fuel of high degree of burn-up, such as an corrosion resistance property of weld zone, an corrosion resistance property of non-welded portions, a tensile property and resistance against hydrogen embrittlement. Also, another object of the invention is to provide a method for producing such a fuel assembly and members therefor.

These and other objects are attained by adopting tubular members and plate members of three-layer structure having a high ductility material in an inner side and a high strength and high corrosion resistance material in an outer side for fuel structural members.

According to the present invention, there is provided a fuel assembly for a nuclear reactor, comprising a fuel cladding tube of three-layer structure having an outer surface layer in contact with reactor water of a nuclear reactor which outer surface layer is made of a Zr-based alloy containing Nb, Sn and Mo, an inner surface layer in contact with nuclear fuel which inner surface layer is made of pure zirconium, and an intermediate layer made of a high ductility alloy which is higher in ductility than the outer surface layer and which is higher in strength than the inner surface layer.

DETAILED DESCRIPTION OF THE INVENTION

A fuel structural member according to the invention will now be described with reference to FIG. 1.

Figure 1A:
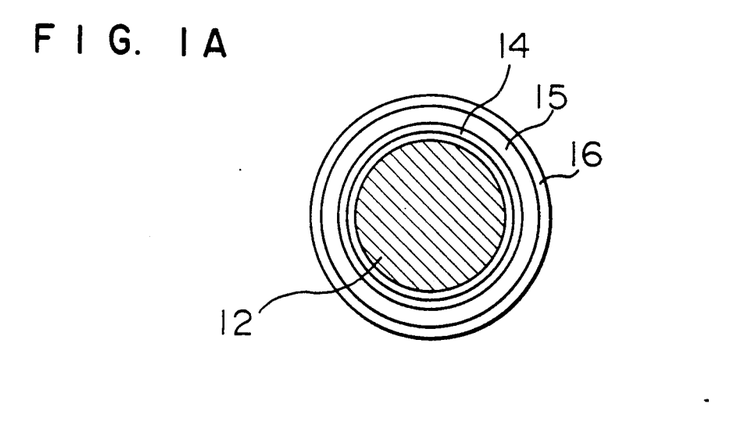
FIGS. 1A to 1C show a basic structure of a fuel assembly for a nuclear reactor according to the invention.

In a fuel cladding tube 11, an outer layer 16 in contact with reactor water is made of high corrosion resistance and high strength alloy, an inner surface layer 14 in contact with fuel pellet 12 is made of pure zirconium, and an intermediate layer 15 is made of alloy having a relatively high ductility, as shown in FIG. 1A, thereby performing the objects of the invention.

Figure 1B:
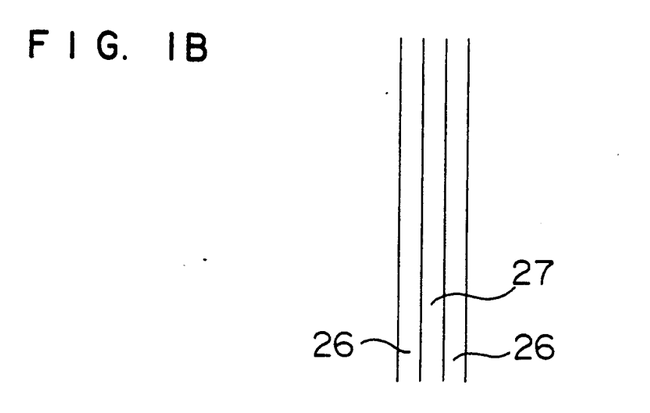
Figure 1C:
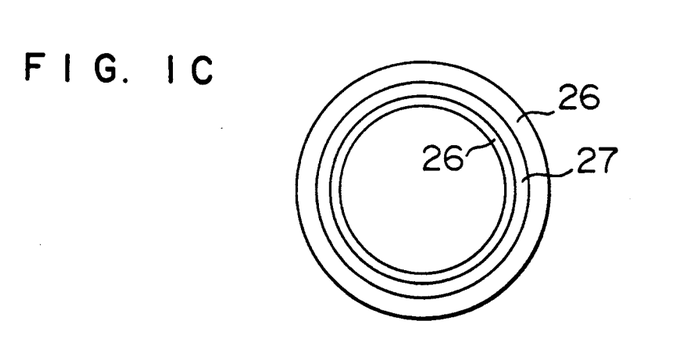

In a spacer 2 and a channel box 3, a surface layers 26 in contact with the reactor water are made of high strength and high anti-corrosion alloy, and an intermediate layer 27 interposed between the surface layers is made of alloy having a high ductility to thereby perform the above-described objects, as shown in FIGS. 1B and 1C.

It is most preferable to use, as the high strength and high alloy, a Zr-based alloy containing 0.5 to 2.2% Nb-0.5 to 1.5% Sn-0.1 to 0.8% Mo. Also, it is preferable to use, as the high ductility alloy, a Zr-based alloy containing 0.5 to 2.0% Sn-0.05 to 0.4% Fe-0.05 to 0.15% Cr-0.03 to 0.2% Ni, a Zr-based alloy containing 0.5 to 2.0% Sn-0.05 to 0.4% Fe-0.03 to 0.2% Ni, a Zr-based alloy containing 0.05 to 2.0% Sn-0.05 to 0.4% Fe-0.05 to 0.15% Cr-0.03 to 0.2% Ni-0.01 to 0.8% Mo, stainless steel or copper alloy.

There can be used, as the high ductility alloy forming the intermediate layer, a stainless steel containing carbon, in an amount, by weight, of not more than 0.08%, and also containing, by weight, not more than 2.0% Mn, not more than 1.00% Si, 16.0 to 20.0% Cr, 8.00 to 14.00% Ni, not more than 3.00% Mo, and the balance Fe and incidental impurities. There can also be used, as the high ductility alloy forming the intermediate layer, a copper-based alloy consisting by weight of not more than 3.0% Pb, not more than 6.0% Fe, not more than 0.5% Zn, not more than 11.0% Al, not more than 2.0% Mn, not more than 33.0% Ni, and the balance Cu and incidental impurities.

If a Zr-based alloy containing Nb-Sn-Mo and having preferably a tensile strength of 70 kgf/mm$^2$ or more at room temperature is used in a surface in contact with the reactor water, it is possible to prevent the nodular corrosion and to increase the strength of the member. Furthermore, the degree of the hydrogen absorption of these alloys is small at about 1/5 of that of zircaloy-2 and zircaloy-4. It is thus possible to prevent the hydrogen embrittlement.

If a high ductility alloy preferably with tensile strength of 45 to 60 kgf/mm$^2$ at room temperature and with an elongation rate 25% or more is used as an intermediate layer interposed between the above-described high strength high anti-corrosion alloy which intermediate layer is out of contact with the fuel pellet, or as an intermediate layer interposed between a pure Zr liner layer, which preferably has a tensile strength of 30 to 40 kgf/mm$^2$ and an elongation rate 30% or more, and the high strength high corrosion resistance alloy, the ductility of the member is enhanced, and in particular, the toughness of a member such as a spacer that is subjected to a impact load during the fuel handling is enhanced. The elongation rate is preferably 30% or more.

As a material forming the intermediate layer, other than those described above, it is preferable to use copper alloy and stainless steel. The tensile strength of these materials at room temperature is shown in Table 1.

TABLE 1

| material | | Composition (%) | tensile strength (kgf/mm$^2$) | elongation (%) |
|---|---|---|---|---|
| copper alloy | 8% Al bronze | 8.0Al—92.0Cu | 45.7 | 60 |

TABLE 1-continued

| material | | Composition (%) | tensile strength (kgf/mm²) | elongation (%) |
|---|---|---|---|---|
| | berylium copper | 2.0Be—98.0Cu | 48.5 | 35 |
| | nickel copper | 66.0Ni—34.0Cu | 53.9 | 42 |
| AISI | 304 | — | 53.0 | 40 |
| | 304L | — | 49.0 | 40 |
| | 347 | — | 53.0 | 40 |
| | 316 | — | 53.0 | 40 |
| | 316L | — | 49.0 | 40 |

Since the high strength high anti-corrosion alloy contains Nb, it is necessary to prevent the reduction in anti-corrosion property of welded portions. In order to satisfy this requirement, the alloy composition must meet the following relationship:

[Sn addition amount] (wt %) ≧ 2×[Nb addition amount] (wt %) −3.0

In addition, the alloy should be heat-treated in the temperature range of 500° to 700° C. after welding. In particular, it is preferable to effect the heat treatment for heating the alloy for 1 to 30 hours in the temperature range of 530° to 610° C.

The reasons therefor will be described below. The causes for the degradation in corrosion property of the weld zone and the heat-affected zone thereof are that a non-equilibrium phase in which a great amount of Nb exists in a solid-solution state is formed during a heating/cooling process in welding. The non-equilibrium phase is formed in such a manner that β phase stable at a high temperature is formed in the weld zone and the heat-affected zone thereof and is quenched. The β phase remains at the room temperature, or is not decomposed into an α-Zr phase and a β-Nb precipitated phase stable at room temperature in the cooling process, and the β phase is martensite-transformed into ω Zr phase. The corrosion property of this phase is extremely low, which causes the reduction in anti-corrosion property in weld zone. The purpose of the heat treatment after welding is to decompose the non-equilibrium phase into the α-Zr phase and the β-Nb precipitated phase stable at room temperature.

Also, the reason why the element of Sn is added to meet the above-described relationship is that Sn has an effect for preventing the generation of the non-equilibrium phase during the cooling process in welding and an effect for accelerating the decomposition of the non-equilibrium phase still remaining after welding.

The reason why the upper limit of preferable temperature range is 610° C. is that, if the alloy is heated above the upper limit, the β phase will be again formed and the β Nb phase that is finely precipitated in the α Zr phase to enhance the strength will be diffused into the β phase to thereby remarkably reduce the strength.

The reason why the lower limit of the preferable temperature range is 530° C. is that the worked structure generated by cold working or the like is heated at 530° C. or above so as to be recrystallized for enhancing the ductility of the material and for promoting the decomposition of the non-equilibrium phase remaining in the welded portions.

The heating in the temperature range of 530° to 610° C. is performed for the purposes of preventing the crystalline particle of the high ductility alloy interposed between the high strength high anti-corrosion alloys from becoming coarse and of preventing superior ductility being degraded.

It is preferable that a thickness of the high strength high anti-corrosion alloy be in the range of 5 to 20%. If the thickness is smaller than the lower limit, it would be very difficult to control the thickness during the manufacture. The upper limit thereof depends upon the necessary strength.

More specifically, in a structural member having a thickness of, for example, 860 μm, if the thickness of the innermost layer is less than 50 μm, it is difficult to control the thickness during the manufacture. Also, the maximum value is 150 μm in view of $I_2$ SCC of the pure zirconium. Therefore, the thickness of the innermost layer is about 5.8 to 17.4% of the total thickness. Preferably, it is 5 to 20% thereof.

On the other hand, from a view point of the anti-corrosion property and the strength, the thickness of the outermost layer is in the range of 100 to 480 μm, that is, in the range of about 11.6 to 55.8% of the total thickness. It is preferable the range of the thickness of the outermost layer be 10 to 60%, and in particular, in case of a cladding tube, it is preferable that the thickness of the outermost layer be 15 to 30%, and as other requisite, it is preferable to make the thickness of a single layer be in the range of 20 to 35%.

In case of the intermediate layer, the maximum and minimum values are varied depending upon the mechanical strength of the material to be used. An example of the maximum and minimum values in case of the intermediate layer of copper alloy or stainless steel is shown in Table 2. It is preferable to set the thickness of the intermediate layer in the range of 25 to 85%. In particular, in case of the cladding tube, it is preferable to set the intermediate layer thickness in the range of 50 to 70%, and in case of other members, it is preferable to set the intermediate layer thickness in the range of 35 to 60%.

TABLE 2

| | | Max. (mm) (% regarding the total thickness) | Mini. (mm) (% regarding the total thickness) |
|---|---|---|---|
| copper alloy | 8% Al bronze | 0.542 (about 63%) | 0.23 (about 27%) |
| | berylium copper | 0.580 (about 67%) | " |
| | nickel copper | 0.70 (about 81%) | " |
| AISI | 304 | 0.68 (about 79%) | " |
| | 304L | 0.60 (about 69%) | " |
| | 347 | 0.68 (about 79%) | " |
| | 316 | 0.68 (about 79%) | " |
| | 316L | 0.60 (about 69%) | " |

The method for producing the above-described fuel structural member of three-layer structure will be described. Interfaces of the three-layer structure are preferably a metallurgically bonded faces.

Figure 6:
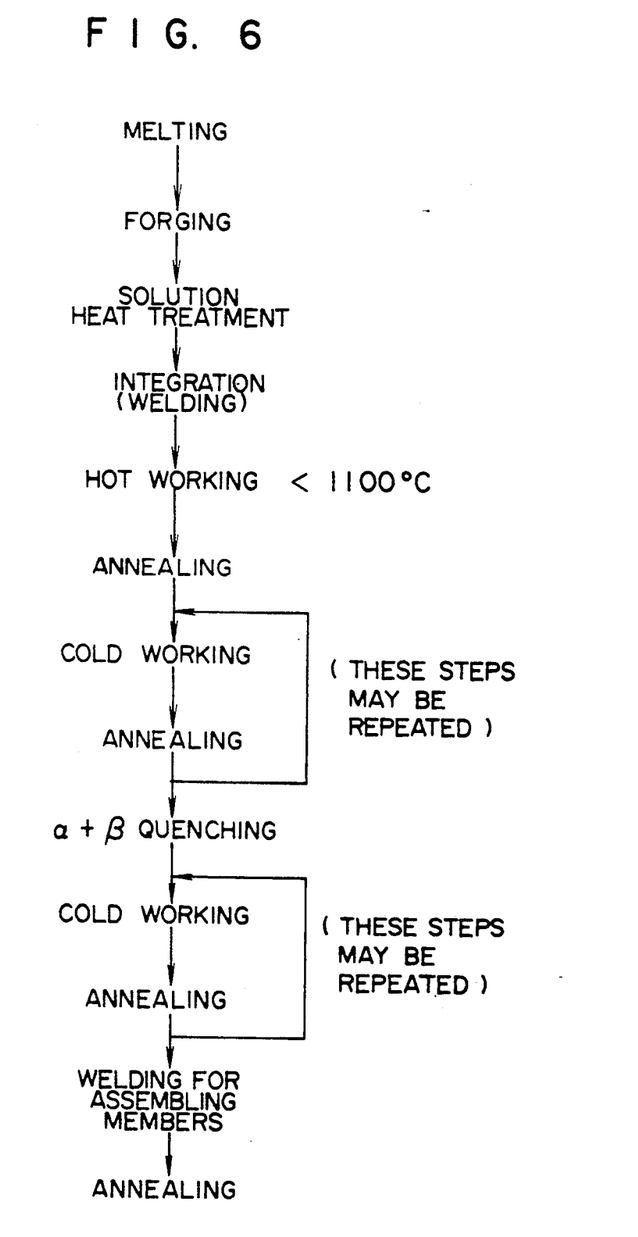
FIG. 6 is a chart showing one example of a process for producing a fuel structural member according to the invention.

FIG. 6 is a view showing an example of a process for producing the fuel structural member according to the present invention.

The integration is performed by the mutual diffusion of metal atoms between the materials at the time of hot rolling or hot extruding and intermediate annealing after cold rolling. When a stable phase such as an oxide film is formed on a surface of the material, this phase becomes a barrier against the mutual diffusion, resulting in inferior metallurgical bonding. Accordingly, any work that contaminate the surface must be avoided.

After the surface is cleaned prior to the hot rolling or hot extruding, the materials forming the respective layers are overlapped with each other. At this time, end faces thereof are welded together to prevent air or the like from entering into the interior. When the welding work is performed in the atmosphere, there is a fear that an oxide layer is formed in the interface in welding. Therefore, it is preferable to perform the welding work under vacuum condition.

The higher the hot extruding temperature or hot rolling temperature, the more the mutual diffusion between the materials will be accelerated. Thus, this is preferable for the metallurgical bonding. However, very coarse $\beta$ phase crystal grains will be caused in the temperature range exceeding 1,100° C. This is undesirable.

If the materials are heated up to the $\alpha+\beta$ phase temperature or the $\beta$ phase temperature, the diffusion of alloy elements will be extremely accelerated. This is preferable for the metallurgical bonding.

Accordingly, it is effective to insert after the hot working a step of heating the materials to the $\alpha+\beta$ phase temperature or the $\beta$ phase temperature and then air- or water-cooling the materials. It is necessary that the water cooling rate be 8° C./sec or more. If the cooling rate is lower than this limit, the precipitated phase will become coarse, to degrade the mechanical property.

After this heat treatment, the cold rolling and annealing must be performed at least once. Since the ductility of the material cooled from the $\alpha+\beta$ phase or the $\beta$ phase is low, it is necessary to grow new crystalline particles having no strain by heating the material above the recrystallization temperature after forming a working structure through the cold rolling. This treatment recovers the ductility.

The invention is explained below in detail by use of embodiments.

Embodiment 1

TABLE 3

| Kinds of | | Alloy elements (wt %) | | | | | |
|---|---|---|---|---|---|---|---|
| No. | Material | Sn | Fe | Ni | Cr | Nb | O | Zr |
| 1 | Pure Zr | — | 0.03 | — | — | — | 0.06 | 99 |
| 2 | Zircalloy | 1.5 | 0.25 | 0.09 | 0.1 | — | 0.11 | bal |
| 3 | NSM alloy | 1.0 | — | — | — | 1.0 | 0.09 | bal |

TABLE 4

| Material | $\sigma u$ (kg/mm$^2$) | $\epsilon l$ (%) |
|---|---|---|
| Pure Zr | 35 | 34 |
| Zircalloy-2 | 56 | 34 |
| NSM alloy | 80 | 20 |

By using a vacuum arc melting method, there were produced a pure Zr ingot, a Zr-Sn-Fe-Ni-Cr alloy ingot, and a Zr-Sn-Nb-Mo alloy ingot. The alloy composition of each of the ingots is shown in Table 3, and the data of strength and elongation about each layer are shown in Table 4.

Each of the ingots was forged at a temperature of 980° to 1050° C. ($\beta$ forging) and the forged billets were formed into billets having diameters different from each other. The forged billets were subjected to a heat-treatment ($\beta$ quenching) in which the billets were water-cooled after being held at 1000° C. for one hour.

After removing the surface oxide layer occurring on the $\beta$-quenched billet materials by mechanical grinding, the billets were subjected to piercing so that the billets were provided with axial holes of diameters different each other. The inner diameter of the hole provided in the Zr-Sn-Fe-Nb-Mo alloy pierced cylindrical billet was approximately equal to the outer diameter of the hole provided in the Zr-Sn-Fe-Ni-Cr alloy pierced cylindrical billet, the latter being inserted in the former by use of a press. The outer diameter of the hole provided in the pure Zr billet was approximately equal to the inner diameter of the pierced Zr-Sn-Fe-Ni-Cr alloy billet, the pure Zr billet being inserted in the latter billet by use of the press so that the three billets were integrated.

The inner diameter of the integrated billets was made to be 50 mm and the outer diameter thereof was made to be 150 mm, in which integrated billets the thickness of the Zr-Sn-Nb-Mo alloy was 10 mm, the thickness of the Zr-Sn-Fe-Ni alloy being 30 mm, and the thickness of the pure Zr being 10 mm. The boundary portions of the ends of the integrated billets were welded under a high vacuum not less than $1 \times 10^{-4}$ Torr by an electron beam welding device. Then, the integrated billets were hot-extruded after being heated to 750° C., with the result that there was produced a tube having an outer diameter of 64 mm and a thickness of 11 mm. Then, the tube was cold-rolled two times by use of pilger mills, so that there was obtained a tube having an outer diameter of 19.2 mm and a thickness of 1.9 mm.

During the production of the tube, an intermediate annealing treatment was effected at 630° C. in 2 hours after the first cold-rolling, then the tube was subjected to a heat-treatment ($\alpha+\beta$ quenching) in which water was jetted onto the tube to effect the cooling thereof just after the tube passed a high frequency induction coil. After the heat-treatment, the tube was again rolled two times by the pilger mills to thereby obtain a tube having an outer diameter of 12.3 mm and a thickness of 0.86 mm, the intermediate annealing being effected at 590° C. in 2 hours, and the final annealing was effected under vacuum at 570° C. for 2 hours.

In the resultant tube there was inserted uranium pellets, and then plugs were attached to both the ends of the tube, which plugs and the tube ends were joined by TIG welding under a He atmosphere of 3 atm, so that a fuel rod was obtained. The weld zones each defined by both the plug and the tube end was heated in a He atmosphere at 580° C. and held in about 10 minutes, then being cooled.

From both the weld zone and the center portion of the resultant fuel rod there were cut out test pieces, which were subjected to a corrosion test and a tensile test. The corrosion test was effected at a temperature of 500° C. in steam of a pressure of 105 kgf/cm$^2$ by holding them in 24 hours. Other test pieces were polished and etched to examine the thickness of each layer.

As a result, it was found that the cross-sectional thickness of the pure Zr was 18% of the whole thickness of the fuel cladding tube, that the thickness of the Zr-Sn-Fe-Ni-Cr alloy layer is 62% thereof, and that the thickness of the Zr-Sn-Nb-Mo alloy layer is 20% thereof, that is, the thickness ratio of the layers was in proportion to the thickness ratio of the initial billets forming the integrated billets.

Figure 7:
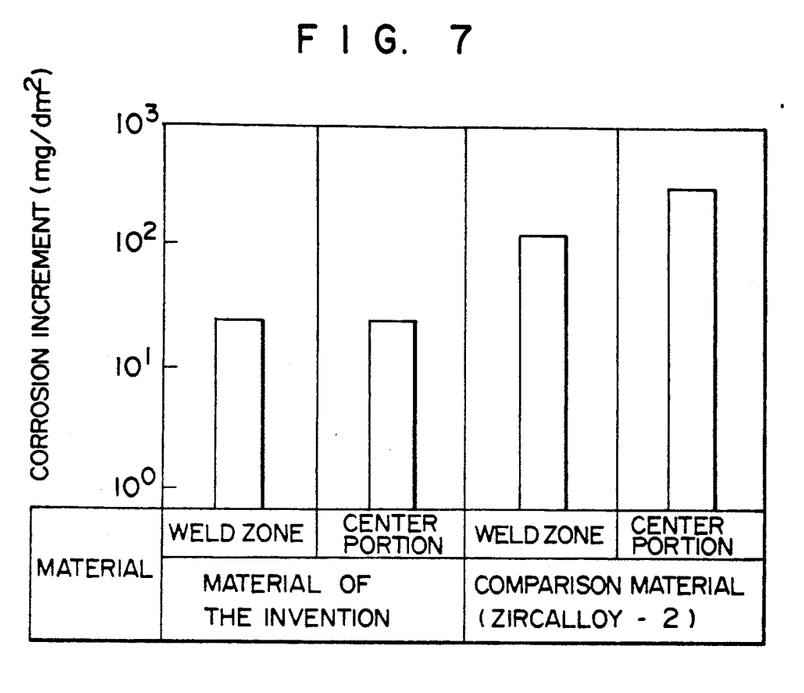
FIG. 7 is a graph showing an experimental result of the fuel cladding tube in the steam.

As apparent from FIG. 7 showing the test results under steam, the anti-corrosion of the material of the invention was very high with respect to both the weld zone and the center portion of the fuel cladding tube in comparison with the comparative material. Further, neither nodular corrosion nor accelerated corrosion of white color occurred on the outer surface (Zr-Sn-Nb-Mo alloy layer) of the material of the invention, which outer surface was covered with a uniform oxide film of black color.

On the other hand, in the comparative material, there were observed at both the weld zone and the center portion thereof much amount of nodular corrosion with respect to the test under steam. The remarkable difference in anti-corrosion occurring therebetween in the test under steam is attributed to the matter regarding whether or not the nodular corrosion occurred.

In the tensile test, the tensile strength of the material of the invention was 63 kgf/mm$^2$, the elongation thereof being 38%, so that the tensile strength of the material of the invention is higher by 5 to 8 kgf/mm$^2$ than a conventional fuel cladding tube made of Zircalloy-2 and the elongation of the material of the invention is in the same degree in comparison therewith.

Embodiment 2

TABLE 5

| No. | Kinds of Material | Alloy elements (wt %) | | | | | | |
|---|---|---|---|---|---|---|---|---|
| | | Sn | Fe | Ni | Cr | Nb | Mo | Zr |
| 1 | Zircalloy | 1.0 | 0.3 | 0.1 | 0.05 | — | — | bal |
| 2 | NSM | 1.0 | — | — | — | 2.0 | 0.2 | bal |

By use of a vacuum melting method, two kinds of alloys shown in Table 5 were melted to thereby provide ingots. The ingots were forged at a temperature of 980° to 1050° C. to provide slabs of 75 mm in thickness. The forged slabs was subjected to β quenching in which the water cooling thereof was effected after holding the slabs at a temperature of 1000° to 1050° C. in 20 minutes. The alloy No. 1 shown in Table 5 was hot-rolled at a temperature of 600° C. to have a thickness of 35 mm, the alloy No. 2 being hot-rolled at a temperature of 750° C. to have a thickness of 20 mm.

After the hot rollings thereof, the surfaces of both the alloys were finished by mechanical grinding. Then, the finished alloy No. 1 was sandwiched between two pieces of plates of the alloy No. 2. The end faces of the three pieces of plates, overlapping each other were integrated by electron beam welding, which integrated plates were hot-rolled two times at 780° C. to provide a sheet having a thickness of 3 mm, which sheet was further cold-rolled to have a thickness of 2 mm and was subjected to an annealing treatment in which it was held at 650° C. in 2 hours. After that, it was held at 870° C. in 5 minutes and then cooled by jetting water onto both surfaces of the sheet.

The sheet was further cold-rolled three times to provide a strip used for a spacer which strip had a thickness of 0.53 mm. Annealing was effected between adjacent two cold-rollings at 590° C. in 1 hour, while the final annealing was effected at 570° C. in 1 hour. From the strip there was formed a spacer band shown in FIG. 4B by punching, and it was subjected to a dimple working.

Further, from the alloy ingots shown in Table 5 there were produced cylindrical billets. The billet of the alloy No. 1 (the intermediate layer billet) was sandwiched by the outer and inner two billets (the outer and inner surface layer billets) of the alloy No. 2 shown in Table 5, which outer surface layer billet of the alloy No. 2 had an outer diameter of 150 mm and a thickness of 15 mm, which intermediate layer billet had a thickness of 20 mm, and which inner surface layer billet had a thickness of 15 mm.

The production process thereof was the same as the embodiment 1 with the exception of the size as shown above, that is, the end faces defined by those of the billets in a sandwich state was integrated by electron beam welding and then the integrated billets were hot-rolled at 750° C. to provide a tube having an outer diameter of 64 mm and a thickness of 11 mm, which tube was rolled one time by a pilger mill to obtain a tube having an outer diameter of 34.9 mm and a thickness of 4.4 mm. The whole length of the tube was then subjected to a treatment in which it was heated to 870° C. while passing a high frequency induction heating coil portion and water was jetted thereon to quench the tube at the position just under the heating portion. After the treatment, it was heat-treated at 600° C. for 1 hour. Further, the cold working and intermediate annealing were alternately effected three times to obtain a tube having an outer diameter of 14 mm and a thickness of 0.6 mm, the temperature of which intermediate annealing was 590° C. The tube was cut to obtain tube members each having a length of 25 mm, which members were plastically worked with a plate spring 28 being attached to each of the tube member so that the tube members was formed into a spacer ring 25 of such configuration as a fuel rod was able to be held in each of the tube members. A plurality of spacer rings were assembled to form a rounded cell type spacer lattice of 9×9 pieces, spacer band 22 being disposed around the outer periphery of the lattice and being spot-welded to thereby obtain a rounded type spacer. After the completion of the assembling thereof, the whole was heat-treated by holding it at 530° C. for 10 hours.

From the spacer there were cut out test pieces a part of which included a weld zone, the test pieces being subjected to a corrosion test in steam of 500° C.

Figure 8:
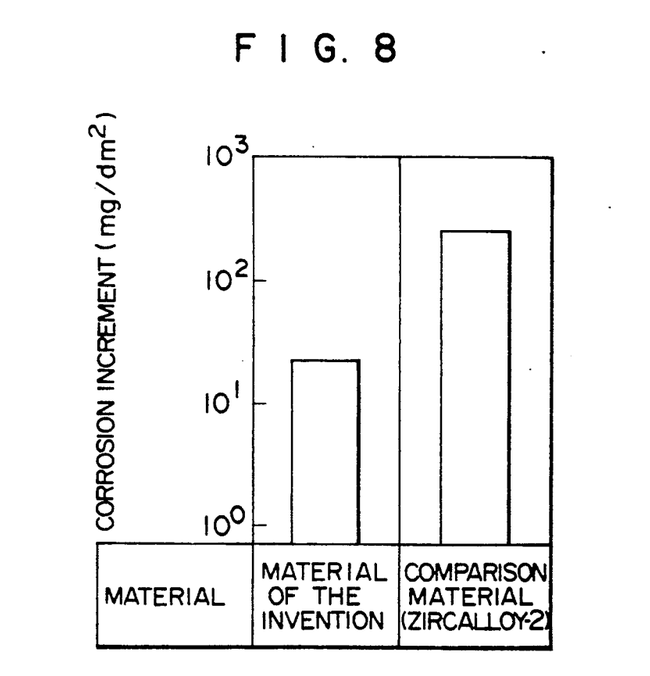
FIG. 8 is a graph showing an experimental result of the spacer in the steam.

After finishing the corrosion tests of both the material of the invention and comparative material (Zircalloy-2), results with respect to the increment of corrosion are shown in FIG. 8. According to the results of the corrosion test in steam, the material of the invention has very high anti-corrosion in comparison with the comparative material. Further, according to appearance observation of the test pieces which observation was effected after the finish of the corrosion test, the surface of the material of the invention was covered with a uniform oxide film of black color, and neither nodular corrosion nor accelerated corrosion of white color were observed on the surface thereof.

On the other hand, much nodular corrosion was observed on the comparative material having been subjected to the corrosion test in steam. This remarkable difference therebetween with respect to anti-corrosion evaluated in steam was attributed to whether or not the nodular corrosion occurred.

After the corrosion test, the content of hydrogen contained in the material of the invention was analyzed, so that the hydrogen absorption rate thereof was 3%. Also, a plate material made of the alloy No. 1 alone and another plate material made of the alloy No. 2 alone were subjected to a corrosion test in high temperature water, and the hydrogen absorption rates thereof were measured with the results that the hydrogen absorption rate of the alloy No. 1 was 35% while the hydrogen absorption rate of the alloy No. 2 was 3%. Thus, it was found that the hydrogen absorption rate of the structure members of the fuel assembly for nuclear reactor according to the invention is the same level as the alloy No. 2.

Further, a plate of the alloy No. 2 alone provided with a notch was subjected to an impact test with the result that the absorption energy thereof was a low value of 3 kg.m/mm$^2$, while the absorption energy of the plate of three-layer structure of the invention was 20 kg.m/mm$^2$ which was a very improved value in comparison with the former.

Thus, by forming the three-layer structure according to the invention, no nodular corrosion occurs, anti-corrosion being improved in a great degree, toughness being improved, and hydrogen absorption rate is lowered.

Embodiment 3

Slabs of the same alloy compositions as in the Embodiment 2 were formed, being then integrated by electron beam welding, and were formed into a plate having a thickness of 75 mm by use of the same process as in the Embodiment 2, wherein the thickness of each alloy was the same value as in the case of the spacer band shown in the Embodiment 2. The plate was then hot-rolled at 780° C. to have a thickness of 20 mm, the plate being again hot-rolled at 780° C. after having been heat-treated at 650° C. in 2 hours to thereby be formed into a sheet having a thickness of 3 mm. The sheet was cold-rolled into a thickness of 2.6 mm after having been held at 600° C. in 2 hours. The final annealing was effected at 600° C. in 2 hours. This sheet was bent to a channel shape, by use of which sheet there was produced a tube of a square cross section by TIG welding. After the welding, bead portions occurring in the welding were flattened by rolling. Thereafter, a mandrel made of a stainless steel was inserted in the interior of the tube of square cross-section, which tube was then held at 600° C. in 2 hours. During this heat treatment, the square tube was plastically deformed in compliance with the shape of the mandrel because the linear expansion coefficient of the stainless steel is higher than that of the structural member, so that the square tube was formed to have a predetermined size.

Test pieces were cut out from the weld zone of the channel box thus produced and were subjected to corrosion test, with the result that the same high anti-corrosion as in the Embodiments 1 and 2 was able to be confirmed.

Also, it was confirmed that, by replacing the Zr-Sn-Fe-Ni-Cr alloy in these Embodiments by Zr-Sn-Fe-Ni-Cr-Mo alloy, there were able to obtain results similar to those of these Embodiments.

According to the invention it is possible to prevent nodular corrosion from occurring and to prevent accelerated corrosion from occurring inherently in a weld zone of an alloy containing Nb. Further, in the invention it is also possible to reduce the hydrogen absorption rate into a degree of not more than 1/10 in comparison with that of the conventional Zircalloy shown in Table 5 and at the same time it is possible to enhance toughness against impact load. Thus, in the invention it is possible to greatly prolong the service life period of a fuel construction member disposed in a nuclear reactor, so that there can be obtained a fuel assembly for nuclear reactor and a member thereof both sufficiently compatible with a tendency to make the degree of burn-up of fuel higher.

What is claimed is:

1. A fuel assembly for a nuclear reactor, comprising a fuel cladding tube of three-layer structure having an outer surface layer to be in contact with reactor water of the nuclear reactor, which outer surface layer is made of a Zr-based alloy containing Nb, Sn and Mo, the Zr-based alloy containing Nb, Sn and Mo consisting by weight of 0.5 to 2.2% Nb, 0.5 to 1.5% Sn, 0.1 to 0.8% Mo, and the balance Zr and incidental impurities, an inner surface layer to be in contact with nuclear fuel, which inner surface layer is made of pure zirconium, and an intermediate layer made of a high ductility alloy which is higher in ductility than the outer surface layer and which is higher in strength than the inner surface layer, a thickness of the intermediate layer being 25%-85% of a total thickness of the three-layer structure.

2. A fuel assembly for a nuclear reactor, comprising a fuel spacer of three-layer structure having outer surface layers to be in contact with reactor water of the nuclear reactor, which outer surface layers are made of a Zr-based alloy containing Nb, Sn and Mo, the Zr-based alloy containing Nb, Sn and Mo consisting by weight of 0.5 to 2.2% Nb, 0.5 to 1.5% Sn, 0.1 to 0.8% Mo, and the balance Zr and incidental impurities, and an intermediate layer adjacent to the outer surface layers, which intermediate layer is made of a high ductility alloy higher in ductility than the outer surface layers, a thickness of the intermediate layer being 25%-85% of a total thickness of the three-layer structure.

3. A fuel assembly for a nuclear reactor, comprising a fuel channel box of three-layer structure having outer surface layers to be in contact with reactor water of the nuclear reactor, which outer surface layers are made of a Zr-based alloy containing Nb, Sn and Mo, the Zr-based alloy containing Nb, Sn and Mo consisting by weight of 0.5 to 2.2% Nb, 0.5 to 1.5% Sn, 0.1 to 0.8% Mo, and the balance Zr and incidental impurities, and an intermediate layer adjacent to the outer surface layers, which intermediate layer is made of a high ductility alloy higher in ductility than the outer surface layers, a thickness of the intermediate layer being 25%-85% of a total thickness of the three-layer structure.

4. A fuel assembly for nuclear reactor of any one of the claims 1 to 3, wherein the high ductility alloy forming the intermediate layer consists of a Zr-based alloy containing Sn, Fe and Ni.

5. A fuel assembly for nuclear reactor of the claim 4, wherein the high ductility alloy forming the intermediate layer consists by weight of 0.5 to 2.0% Sn, 0.05 to 0.4% Fe, 0.03 to 0.2% Ni, and the balance Zr and incidental impurities.

6. A fuel assembly for nuclear reactor of any one of the claims 1 to 3, wherein the high ductility alloy forming the intermediate layer is a Zr-based alloy containing Sn, Fe, Ni and Cr.

7. A fuel assembly for nuclear reactor of the claim 6, wherein the high ductility alloy forming the intermediate layer consists by weight of 0.5 to 2.0% Sn, 0.05 to 0.4% Fe, 0.03 to 0.2% Ni, 0.05 to 0.15% Cr, and the balance Zr and incidental impurities.

8. A fuel assembly for nuclear reactor of any one of the claims 1 to 3, wherein the high ductility alloy forming the intermediate layer is a Zr-based alloy containing Sn, Fe, Ni, Cr and Mo.

9. A fuel assembly for nuclear reactor of the claim 8, wherein the high ductility alloy forming the intermediate layer consists by weight of 0.5 to 2.0% Sn, 0.05 to 0.4% Fe, 0.03 to 0.2% Ni, 0.05 to 0.15% Cr, 0.01 to 0.8% Mo, and the balance Zr and incidental impurities.

10. A fuel assembly for nuclear reactor of any one of the claims 1 to 3, wherein the high ductility alloy forming the intermediate layer consists of Zr and incidental impurities.

11. A fuel assembly for nuclear reactor of any one of the claims 1 to 3, wherein the high ductility alloy forming the intermediate layer consists by weight of 0.1 to 0.7% Nb, and the balance Zr and incidental impurities.

12. A fuel assembly for nuclear reactor of any one of the claims 1 to 3, wherein the high ductility alloy forming the intermediate layer is a stainless steel containing carbon, the carbon being included in an amount, by weight, up to 0.08%, and the stainless steel also containing, by weight, 0-2.0% Mn, 0-1.00% Si, 16.0 to 20.0% Cr, 8.00 to 14.00% Ni, 0-3.00% Mo, and the balance Fe and incidental impurities.

13. A fuel assembly for nuclear reactor of any one of the claims 1 to 3, wherein the high ductility alloy forming the intermediate layer is a Cu-based alloy consisting by weight of 0-3.0% Pb, 0-6.0% Fe, 0-0.5% Zn, 0-11.0% Al, 0-2.0% Mn, 0-33.0%; Ni, and the balance Cu and incidental impurities.

14. A fuel assembly for nuclear reactor of claim 1, wherein in the fuel cladding tube the thickness of the outer surface layer to be in contact with the reactor water of the nuclear reactor is 10 to 30% of the total thickness of the cladding tube.

15. A method of producing a fuel assembly for nuclear reactor of any one of the claims 1 to 3, 14 and 28, comprising the step of effecting a heat-treatment at a temperature of 400° to 700° C. after welding when assembling the three-layer structure.

16. A method of producing a fuel assembly for nuclear reactor of claim 2, comprising the step of effecting a heat-treatment at a temperature of 400° to 700° C. after welding the end face of a tubular or plate-like member.

17. A method of producing the fuel assembly for nuclear reactor of any one of the claims 1 and 14, wherein the fuel cladding tube is produced by a process comprising the steps of: inserting a cylindrical billet of an alloy, which becomes an intermediate layer, into another cylindrical billet which becomes an outer surface layer in contact with the reactor water of the nuclear reactor; inserting into the intermediate layer billet a cylindrical billet which becomes an inner surface layer; integrating all of these billets by welding each end face thereof; extruding the integrated billets at a temperature of 500° to 800° C.; and repeating both cold working and annealing thereof by a plurality of times.

18. A method of producing the fuel assembly for nuclear reactor of claim 2, wherein the cylindrical fuel spacer is produced by a process comprising the steps of: inserting a cylindrical billet of an alloy, which becomes an intermediate layer, into another cylindrical billet which becomes an outer surface layer in contact with the reactor water of the nuclear reactor; inserting into the intermediate layer billet a cylindrical billet which becomes an inner surface layer and which is made of the same material as the outer surface layer; integrating all of the billets by welding each end face thereof; extruding the integrated billets at a temperature not less than 610° C.; and repeating both cold working and annealing thereof by a plurality of times.

19. A method of producing the fuel assembly for nuclear reactor of claim 17, wherein the welding is effected under a pressure not more than $1 \times 10^{-4}$ Torr.

20. A method of producing the fuel assembly for nuclear reactor of claim 17, wherein an intermediate annealing between adjacent two cold workings is effected at a temperature of 610° to 750° C.

21. A method of producing the fuel assembly for nuclear reactor of claim 17, wherein the fuel cladding tube is subjected to a heat treatment comprising the steps of heating the surface layer of or heating the total thickness of the cladding tube at a temperature of 800° to 900° C. after the final hot working but before the final cold working, and then quenching it.

22. A method of producing the fuel assembly for nuclear reactor of claim 3, wherein the fuel channel box is produced by a process comprising the steps of: inserting a plate of an alloy, which becomes an intermediate layer, between plate members which become outer surface layers in contact with the reactor water of the nuclear reactor; integrating them by welding each end face thereof; extruding the integrated members at a temperature of 500° to 800° C.; and repeating both cold working and annealing thereof by a plurality of times.

23. A method of producing the fuel assembly for nuclear reactor of any one of claims 22 and 46, wherein an intermediate annealing between adjacent two cold workings is effected at a temperature of 610° to 750° C.

24. A method of producing the fuel assembly for nuclear reactor of claim 22, wherein the fuel channel box is subjected to a heat treatment comprising the steps of heating it at a temperature of 800° to 900° C. after the final hot working but before the final cold working, and then quenching it.

25. A member for a fuel assembly for a nuclear reactor, comprising a three-layer structure having an outer surface layer of a Zr-based alloy containing Nb, Sn and Mo, the Zr-based alloy containing Nb, Sn and Mo consisting by weight of 0.5 to 2.3% Nb, 0.5 to 1.5% n, 0.1 to 0.8% Mo, and the balance Zr and incidental impurities, which outer surface layer is to be in contact with reactor water of the nuclear reactor, and an intermediate layer of a high ductility alloy which is higher in ductility than the Zr-based alloy containing Nb, Sn and Mo and which is higher in strength than pure Zr, a thickness of the intermediate layer being 25%-85% of a total thickness of the three-layer structure.

26. A member for a fuel assembly of claim 25, wherein the three-layer structure further includes an inner surface layer, such that the inner surface layer and outer surface layer sandwich the intermediate layer, the inner surface layer being made of pure zirconium.

27. A fuel assembly for nuclear reactor of claim 3, wherein in the channel box a thickness of each of the outer surface layers is 20 to 35% of the total thickness of the channel box.

28. A member for a fuel assembly of claim 25, wherein the Zr-based alloy containing Nb, Sn and Mo has a tensile strength of at least 70 kgf/mm$^2$ at room temperature.

29. A member for a fuel assembly of claim 25, wherein the high ductility alloy has a tensile strength of 45–60 kgf/mm$^2$ at room temperature and an elongation rate of at least 25%.

30. A method of producing a fuel assembly for nuclear reactor of claim 5, comprising the step of effecting a heat-treatment at a temperature of 400° to 700° C. after welding when assembling the three-layer structure.

31. A method of producing a fuel assembly for nuclear reactor of claim 5, comprising the step of effecting a heat-treatment at a temperature of 400° to 700° C. after welding when assembling the three-layer structure.

32. A method of producing a fuel assembly for nuclear reactor of claim 6, comprising the step of effecting a heat-treatment at a temperature of 400° to 700° C. after welding when assembling the three-layer structure.

33. A method of producing a fuel assembly for nuclear reactor of claim 7, comprising the step of effecting a heat-treatment at a temperature of 400° to 700° C. after welding when assembling the three-layer structure.

34. A method of producing a fuel assembly for nuclear reactor of claim 8, comprising the step of effecting a heat-treatment at a temperature of 400° to 700° C. after welding when assembling the three-layer structure.

35. A method of producing a fuel assembly for nuclear reactor of claim 9, comprising the step of effecting a heat-treatment at a temperature of 400° to 700° C. after welding when assembling the three-layer structure.

36. A method of producing a fuel assembly for nuclear reactor of claim 10, comprising the step of effecting a heat-treatment at a temperature of 400° to 700° C. after welding when assembling the three-layer structure.

37. A method of producing a fuel assembly for nuclear reactor of claim 11 comprising the step of effecting a heat-treatment at a temperature of 400° to 700° C. after welding when assembling the three-layer structure.

38. A method of producing a fuel assembly for nuclear reactor of claim 12, comprising the step of effecting a heat-treatment at a temperature of 400° to 700° C. after welding when assembling the three-layer structure.

39. A method of producing a fuel assembly for nuclear reactor of claim 13, comprising the step of effecting a heat-treatment at a temperature of 400° to 700° C. after welding when assembling the three-layer structure.

40. A method of producing a fuel assembly for nuclear reactor of claim 10, comprising the step of effecting a heat-treatment at a temperature of 400° to 700° C. after welding the end face of a tubular or plate-like member.

41. A method of producing the fuel assembly for nuclear reactor of claim 18, wherein the welding is effected under a pressure not more than $1 \times 10^{-4}$ Torr.

42. A method of producing the fuel assembly for nuclear reactor of claim 18, wherein an intermediate annealing between adjacent two cold workings is effected at a temperature of 610° to 750° C.

43. A method of producing the fuel assembly for nuclear reactor of claim 18, wherein the cylindrical fuel spacer is subjected to a heat treatment comprising the steps of heating the surface layer of or heating the total thickness of the cylindrical fuel spacer at a temperature of 800° to 900° C. after the final hot working but before the final cold working, and then quenching it.

44. A method of producing the fuel assembly for nuclear reactor of claim 2, wherein the fuel spacer is produced by a process comprising the steps of: inserting a plate of an alloy, which becomes an intermediate layer, between plate members which become outer surface layers in contact with the reactor water of the nuclear reactor; integrating them by welding each end face thereof; extruding the integrated members at a temperature of 500° to 800° C.; and repeating both cold working and annealing thereof by a plurality of times.

45. A method of producing the fuel assembly for nuclear reactor of claim 44, wherein the fuel spacer is subjected to a heat treatment comprising the steps of heating it at a temperature of 800° to 900° C. after the final hot working but before the final cold working, and then quenching it.

46. A fuel assembly for a nuclear reactor, comprising a fuel cladding tube of three-layer structure having an outer surface layer to be in contact with reactor water of the nuclear reactor, which outer surface layer is made of a Zr-based alloy containing Nb, Sn and Mo, the Zr-based alloy containing Nb, Sn and Mo consisting by weight of 0.5 to 2.2% Nb, 0.5 to 1.5% Sn, 0.1 to 0.8% Mo, and the balance Zr and incidental impurities, an inner surface layer to be in contact with nuclear fuel, which inner surface layer is made of pure zirconium, and an intermediate layer made of a high ductility alloy which is higher in ductility than the outer surface layer and which is higher in strength than the inner surface layer, wherein the high ductility alloy forming the intermediate layer consists by weight of 0.5 to 2.0% Sn, 0.05 to 0.4% Fe, 0.03 to 0.2% Ni, 0.05 to 0.15% Cr, 0.01 to 0.8% Mo, and the balance Zr and incidental impurities, a thickness of the intermediate layer being 25%–85% of a total thickness of the three-layer structure.

47. A fuel assembly for nuclear reactor, comprising a fuel spacer of three-layer structure having outer surface layers to be in contact with reactor water of the nuclear reactor, which outer surface layers are made of a Zr-based alloy containing Nb, Sn and Mo, the Zr-based alloy having properties that no nodular corrosion or corrosion of white color occurs when the alloy is exposed to steam of a pressure of 105 kgf/cm$^2$ at 500° C. for 24 hours, and having a tensile strength of at least 70 kgf/mm$^2$ at room temperature, and an intermediate layer adjacent to the outer surface layers, which intermediate layer is made of a high ductility alloy higher in ductility than the outer surface layers, wherein the high ductility alloy forming the intermediate layers consists by weight of 0.5 to 2.0% Sn, 0.05 to 0.4% Fe, 0.03 to 0.2% Ni, 0.05 to 0.15% Cr, 0.01 to 0.8% Mo, and the balance Zr and incidental impurities, a thickness of the intermediate layer being 25%–85% of a total thickness of the three-layer structure.

48. A fuel assembly for a nuclear reactor, comprising a fuel channel box of three-layer structure having outer surface layers to be in contact with reactor water of the nuclear reactor, which outer surface layers are made of a Zr-based alloy containing Nb, Sn and Mo, the Zr-based alloy having properties that no nodular corrosion or corrosion of white color occurs when the alloy is exposed to steam of a pressure of 105 kgf/cm$^2$ at 500° C. for 24 hours, and having a tensile strength of at least 70 kgf/mm$^2$ at room temperature, and an intermediate layer adjacent to the outer surface layers, which intermediate layer is made of a high ductility alloy higher in ductility than the outer surface layers, wherein the higher ductility alloy forming the intermediate layer consists by weight of 0.5 to 2.0% Sn, 0.05 to 0.4% Fe, 0.03 to 0.2% Ni, 0.05 to 0.15% cr, 0.01 to 0.8% Mo, and the balance Zr and incidental impurities, a thickness of the intermediate layer being 25%–85% of a total thickness of the three-layer structure.

49. A fuel assembly for a nuclear reactor, comprising a fuel cladding tube of three-layer structure having an outer surface layer to be in contact with reactor water of a nuclear reactor, which outer surface layer is made of a Zr-based alloy containing Nb, Sn and Mo, the Zr-based alloy containing Nb, Sn and Mo consisting by weight of 0.5 to 2.2% Nb, 0.5 to 1.5% Sn, 0.1 to 0.8% Mo, and the balance Zr and incidental impurities, an inner surface layer to be in contact with nuclear fuel, which inner surface layer is made of pure zirconium, and an intermediate layer made of a high ductility alloy, which is higher in ductility than the outer surface layer and which is higher in strength than the inner surface layer, wherein the high ductility alloy forming the intermediate layer is a stainless steel, containing carbon, the carbon being included in an amount, by weight, of not more than 0.08% C, and the stainless steel also containing, by weight, 0-2.0% Mn, 0-1.00% Si, 16.0 to 20.0% Cr, 8.00 to 14.00% Ni, 0-3.00% Mo, and the balance Fe and incidental impurities, a thickness of the intermediate layer being 25%–85% of a total thickness of the three-layer structure.

50. A fuel assembly for a nuclear reactor, comprising a fuel spacer of three-layer structure having outer surface layers to be in contact with reactor water of the nuclear reactor, which outer surface layers are made of a Zr-based alloy containing Nb, Sn and Mo, the Zr-based alloy having properties that no nodular corrosion or corrosion of white color occurs when the alloy is exposed to steam of a pressure of 105 kgf/cm$^2$ at 500° C. for 24 hours, and having a tensile strength of at least 70 kgf/mm$^2$ at room temperature, and an intermediate layer adjacent to the outer surface layers, which intermediate layer is made of a high ductility alloy higher in ductility than the outer surface layers, wherein the high ductility alloy forming the intermediate layer is a stainless steel, containing carbon, the carbon being included in an amount, by weight, of not more than 0.08% C, and the stainless steel also containing, by weight, 0-2.0% Mn, 0-1.0% Si, 16.0 to 20.0% Cr, 8.00 to 14.00% Ni, 0-3.00% Mo, and the balance Fe and incidental impurities, a thickness of the intermediate layer being 25%–85% of a total thickness of the three-layer structure.

51. A fuel assembly for a nuclear reactor, comprising a fuel channel box of three-layer structure having outer surface layers to be in contact with reactor water of the nuclear reactor, which outer surface layers are made of a Zr-based alloy containing Nb, Sn and Mo, the Zr-based alloy having properties that no nodular corrosion or corrosion of white color occurs when the alloy is exposed to steam of a pressure of 105 kgf/cm$^2$ at 500° C. for 24 hours, and having a tensile strength of at least 70 kgf/mm$^2$ at room temperature, and an intermediate layer adjacent to the outer surface layers, which intermediate layer is made of a high ductility alloy higher in ductility than the outer surface layers, wherein the high ductility alloy forming the intermediate layer is a stainless steel, containing carbon, the carbon being included in an amount, by weight, of not more than 0.08% C, and the stainless steel also containing, by weight, 0-2.0% Mn, 0-1.00% Si, 16.0 to 20.0% cr, 8.00 to 14.00% Ni, 0-3.00% Mo, and the balance Fe and incidental impurities, a thickness of the intermediate layer being 25%–85% of a total thickness of the three-layer structure.

52. A fuel assembly for a nuclear reactor, comprising a fuel cladding tube of three-layer structure having an outer surface layer to be in contact with reactor water of the nuclear reactor, which outer surface layer is made of a Zr-based alloy containing Nb, Sn and Mo, the Zr-based alloy containing Nb, Sn and Mo consisting by weight of 0.5 to 2.2% Nb, 0.5 to 1.5% Sn, 0.1 to 0.8% Mo, and the balance Zr and incidental impurities, an inner surface layer to be in contact with nuclear fuel, which inner surface layer is made of pure zirconium, and an intermediate layer made of a high ductility alloy, which is higher in ductility than the outer surface layer and which is higher in strength than the inner surface layer, wherein the high ductility alloy forming the intermediate layer is a Cu-based alloy consisting by weight of 0-3.0% Pb, 0-6.0% Fe, 0-0.5 Zn, 0-11.0% Al, 0-2.0% Mn, 0-33.0% Ni, and the balance of Cu and incidental impurities, a thickness of the intermediate layer being 25%–85% of a total thickness of the three-layer structure.

53. A fuel assembly for a nuclear reactor, comprising a fuel spacer of three-layer structure having outer surface layers to be in contact with reactor water of the nuclear reactor, which outer surface layers are made of a Zr-based alloy containing Nb, Sn and Mo, the Zr-based alloy having properties that no nodular corrosion or corrosion of white color occurs when the alloy is exposed to steam of a pressure of 105 kgf/cm$^2$ at 500° C. for 24 hours, and having a tensile strength of at least 70 kgf/mm$^2$ at room temperature, and an intermediate layer adjacent to the outer surface layers, which intermediate layer is made of a high ductility alloy higher in ductility than the outer surface layers, wherein the high ductility alloy forming the intermediate layer is a Cu-based alloy consisting by weight of 0-3.0% Pb, 0-6.0% Fe, 0-0.5% Zn, 0-11.0% Al, 0-2.0% Mn, 0-33.0% Ni, and the balance Cu and incidental impurities, a thickness of the intermediate layer being 25%–85% of a total thickness of the three-layer structure.

54. A fuel assembly for a nuclear reactor, comprising a fuel channel box of three-layer structure having outer surface layers to be in contact with reactor water of the nuclear reactor, which outer surface layers are made of a Zr-based alloy containing Nb, Sn and Mo, the Zr-based alloy having properties that no nodular corrosion or corrosion of white color occurs when the alloy is exposed to steam of a pressure of 105 kgf/cm$^2$ at 500° C. for 24 hours, and having a tensile strength of at least 70 kgf/mm$^2$ at room temperature, and an intermediate layer adjacent to the outer surface layers, which intermediate layer is made of a high ductility alloy higher in ductility than the outer surface layers, wherein the high ductility alloy forming the intermediate layer is a Cu-based alloy consisting by weight of 0-3.0% Pb, 0-6.0% Fe, 0-0.5% Zn, 0-11.0% Al, 0-2.0% Mn, 0-33.0% Ni, and the balance Cu and incidental impurities, a thickness of the intermediate layer being 25%–85% of a total thickness of the three-layer structure.

55. A fuel assembly for a nuclear reactor, comprising a fuel cladding tube of three-layer structure having an outer surface layer to be in contact with reactor water of the nuclear reactor, which outer surface layer is made of a Zr-based alloy containing Nb, Sn and Mo, the Zr-based alloy containing Nb, Sn and Mo consisting by weight of 0.5 to 2.2% Nb, 0.5 to 1.5% Sn, 0.1 to 0.8%

Mo, and the balance Zr and incidental impurities, an inner surface layer to be in contact with nuclear fuel, which inner surface layer is made of pure zirconium, and an intermediate layer made of a high ductility alloy, which is higher in ductility than the outer surface layer and which is higher in strength than the inner surface layer, a thickness of the outer surface layer being 10% to 30% of the total thickness of the cladding tube, a thickness of the intermediate layer being 25%–85% of a total thickness of the three-layer structure.

56. A fuel assembly for a nuclear reactor, comprising a fuel channel box of three-layer structure having outer surface layers to e in contact with reactor water of the nuclear reactor, which outer surface layers are made of a Zr-based alloy containing Nb, Sn and Mo, the Zr-based alloy having properties that no nodular corrosion or corrosion of white color occurs when the alloy is exposed to steam of a pressure of 105 kgf/cm$^1$ at 500° C. for 24 hours, and having a tensile strength of at least 70 kgf/mm$^2$ at room temperature, and an intermediate layer adjacent to the outer surface layers, which intermediate layer is made of a high ductility alloy higher in ductility than the outer surface layers, a thickness of each of the outer surface layers being 20 to 35% of the total thickness of the fuel channel box, a thickness of the intermediate layer being 25%–85% of a total thickness of the three-layer structure.

57. A fuel assembly for a nuclear reactor, comprising a fuel spacer of three-layer structure having (a) outer surface layers to be in contact with reactor water of the nuclear reactor, which outer surface layers are made of a Zr-based alloy containing Nb, Sn and MO, the Zr-based alloy having properties that no nodular corrosion or corrosion of white color occurs when the alloy is exposed to steam of a pressure of 105 kgf/cm$^2$ at 500° C. for 24 hours, and having a tensile strength of at least 70 kgf/mm$^2$ at room temperature, and (b) an intermediate layer adjacent to the outer surface layers, which intermediate layer is made of a high ductility alloy higher in ductility than the outer surface layers, the intermediate layer being made of a material selected from the group consisting of Zr-based alloy, stainless steel alloy and copper-based alloy, having a tensile strength of 45 to 60 kgf/mm$^2$ at room temperature and an elongation rate of at least 25%, a thickness of the intermediate layer being 25%–85% of a total thickness of the three-layer structure.

58. A fuel assembly for a nuclear reactor, comprising a fuel channel box of three-layer structure having (a) outer surface layers to be in contact with reactor water of the nuclear reactor, which outer surface layers are made of a Zr-based alloy containing Nb, Sn and Mo, the Zr-based alloy having properties that no nodular corrosion or corrosion of white color occurs when the alloy is exposed to steam of a pressure of 105 kgf/cm$^2$ at 500° C. for 24 hours, and having a tensile strength of at least 70 kgf/mm$^2$ at room temperature, and (b) an intermediate layer adjacent to the outer surface layers, which intermediate layer is made of a high ductility alloy higher in ductility than the outer surface layers, the intermediate layer being made of a material selected from the group consisting of Zr-based alloy, stainless steel alloy and copper-based alloy, having a tensile strength of 45 to 60 kgf/mm$^2$ at room temperature and an elongation rate of at least 25%, a thickness of the intermediate layer being 25%–85% of a total thickness of the three-layer structure.

59. A member for a fuel assembly of claim 25, wherein the outer surface layer has a thickness that is 10% to 60% of the total thickness of the three-layer structure.

60. A member for a fuel assembly of claim 59, wherein the three-layer structure includes an inner surface layer, which has a thickness that is 5–20% of the total thickness of the three-layer structure.

61. A member for a fuel assembly for a nuclear reactor, comprising a three-layer structure having an outer surface layer of a Zr-based alloy containing Nb, Sn and Mo, which outer surface layer is to be in contact with reactor water of the nuclear reactor, and an intermediate layer of a high ductility alloy which is higher in ductility than the Zr-based alloy containing Nb, Sn and Mo and which is higher in strength than pure Zr, a thickness of the intermediate layer being 25%–85% of a total thickness of the three-layer structure.

62. A member for a fuel assembly of claim 61, wherein the intermediate layer is made of a material selected from the group consisting of Zr-based alloy, stainless steel and copper-based alloy.

63. A member for a fuel assembly of claim 62, wherein the outer surface layer has a thickness that is 10%–60% of the total thickness of the three-layer structure.

64. A member for a fuel assembly of claim 63, wherein the three-layer structure includes an inner surface layer, which has a thickness that is 5–20% of the total thickness of the three-layer structure.

65. A member for a fuel assembly of claim 64, said member being selected from the group consisting a fuel cladding tube, a fuel channel box and a fuel spacer.

66. A member for a fuel assembly of claim 64, wherein the three-layer structure includes an inner surface layer, made of Zr, the intermediate layer being higher in strength than the inner surface layer.

* * * * *